H. D. Snow,
Governor Valve.
No. 1,309. Reissued May 13, 1862.
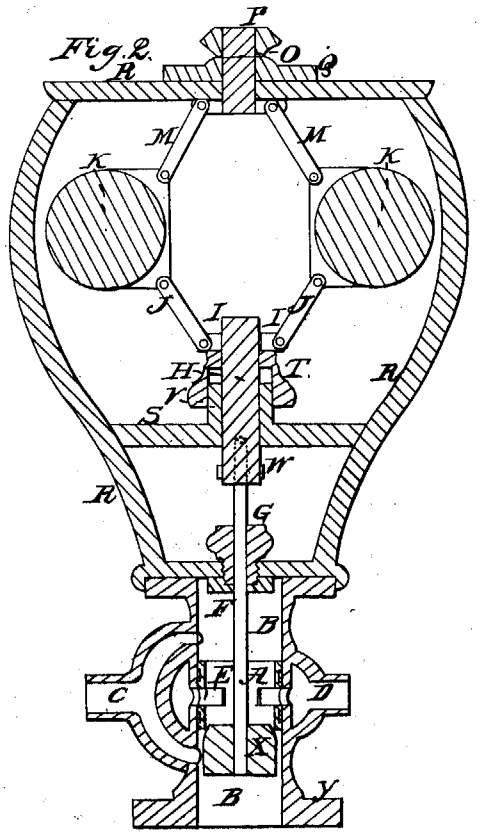
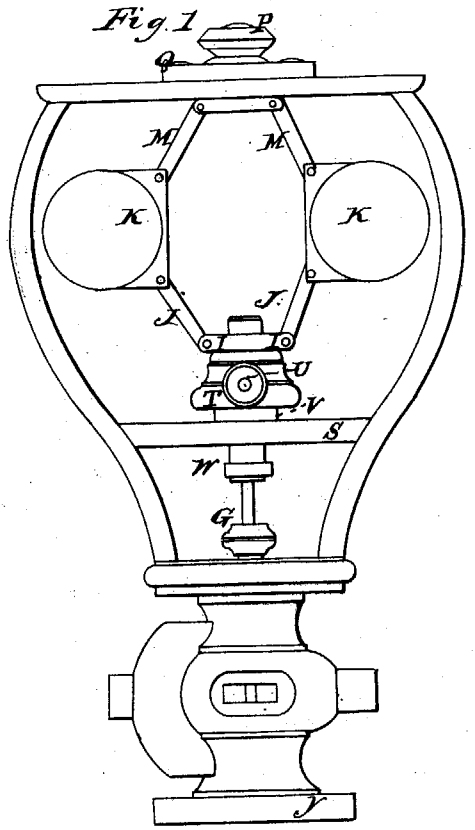
Witnesses:
Charles J. Powers
H. F. Bush
Inventor:
H. D. Snow
N. PETERS, PHOTO-LITHOGRAPHER, WASHINGTON, D. C.

UNITED STATES PATENT OFFICE.

H. D. SNOW, OF ROCHESTER, NEW YORK.

IMPROVEMENT IN GOVERNOR-VALVES.

Specification forming part of Letters Patent No. 25,769, dated October 11, 1859; Reissue No. 1,309, dated May 13, 1862.

*To all whom it may concern:*

Be it known that I, H. D. SNOW, of Rochester, in the county of Monroe and State of New York, have invented a new and useful Self-Acting Safety-Governor for Steam-Engines; and I do hereby declare that the following is a full, clear, and exact description thereof, reference being had to the accompanying drawings, making a part of this specification, in which—

Figure 1 is a side elevation of the governor. Fig. 2 is a vertical central section of the same.

The nature of my invention consists in constructing steam governors in such a manner as that the downward movement of the balls, when below the point affording the full opening of the valve, shall entirely close it, so as to stop the engine in case the governor becomes inoperative, which frequently occurs, and in which case the engine "runs away" unless the flow of steam is at once cut off, and generally results in more or less damage to the machinery or to the engine, or both. By the application of my invention the ordinary steam-governor is made to perform this important duty, in addition to its regulation of the flow of steam, and therefore constitutes a "self-acting safety-governor."

A is the valve. B is the valve-chamber, into which the valve A is fitted so as to slide without too much friction, and if properly fitted it will not need to be "packed" on its bearing-surface. C is the steam-passage on one side, with branches which enter the valve-chamber B, one above and the other below the valve. D is the steam-passage on the other side, and extends entirely around the valve-chamber and communicates therewith by the openings E. F is the valve-stem, and is connected to the valve by a pin passing through both. The valve-stem passes out of the valve-chamber through a common stuffing-box at G, and is connected to the sliding shaft H. On the upper end of this shaft is arranged the stops I, to which are attached the links J. The upper ends of J are hinged one to each of the two governor-balls K. Two similar links, M, are hinged to the upper part of the balls K and to the vertical shaft O by means of ears upon its lower end. To this shaft O is attached the pinion P, to which the motion is communicated from the engine in the usual manner. Q is the bearing in which O revolves, and R is the frame which supports it. The bearing for the shaft H is formed in the cross-bar S and hub V. On this hub is fitted, so as to slide vertically, the adjustable collar T, which is provided with a set-screw, U, by which it is held at the top of the hub, in order to keep the valve open, as seen in Fig. 2, while starting the engine, after which the screw should be loosened and the collar be dropped down to the cross-bar S, which position allows the valve A to drop far enough, in case the balls K cease to revolve, to cause the upper part of the valve to cover the port E, and thereby entirely cut off the flow of steam from the engine.

The stop W is arranged upon the lower end of the shaft H in such a position as to insure the covering of the opening E by the lower part of the valve when W is raised against the cross bar S, as by the increase of the speed of the engine.

There may be a weight, X, attached to the lower end of the valve-stem F, to counteract any tendency which the valve may have to stick in the chamber, and thereby prevent loss of motion, which might otherwise occur by reason of looseness in the joints between the governor-balls K and the valve.

The steam-pipes are connected with the steam-passages C and D, (either of which may be made the induction and the other the eduction,) and if they do not support the whole sufficiently well the flange Y may be set upon a pedestal or other suitable support and secured thereto, so as to close by a steam-tight joint the lower end of the valve chamber; otherwise it should be closed by a plate or head.

What I claim as my invention, and desire to secure by Letters Patent, is—

Constructing steam-governors, substantially as set forth, so as that the downward movement of the balls, when they drop below the point affording a full opening to the valve, shall tend to close it.

H. D. SNOW.

Witnesses:
DANIEL DE GAIRNO,
ISAAC RULOFSON.